United States Patent [15] 3,707,044
Faconti, Jr. et al. [45] Dec. 26, 1972

[54] SWITCHING DEVICE AND ASSOCIATED VISUAL DISPLAY FOR TRAINING APPARATUS

[72] Inventors: Victor Faconti, Jr., Binghamton, N.Y.; William C. Booth, Reisterstown, Md.

[73] Assignee: The Singer Company, New York, N.Y.

[22] Filed: May 20, 1969

[21] Appl. No.: 826,178

[52] U.S. Cl. .................................... 35/12, 340/324
[51] Int. Cl. ........................... B64g 7/00, G09b 9/08
[58] Field of Search ......... 35/10, 11, 12, 13; 340/324

[56] References Cited

UNITED STATES PATENTS 3,058,663 10/1962 Barnard .................................... 236/1
3,310,883 3/1967 Young .................................... 35/10
3,387,084 6/1968 Hine et al. .............................. 178/6.8

*Primary Examiner*—Robert W. Michell
*Assistant Examiner*—L. R. Oremland
*Attorney*—Francis L. Masselle, William Grobman and Charles S. McGuire

[57] ABSTRACT

A system for use in conjunction with training apparatus such as an aircraft simulator, for example, to allow selective changes in the parameters affecting operation of the apparatus by providing a plurality of manually operable switch means, each being programmable to control various ones of such parameters, with a visual display which changes as the program is changed to indicate to an instructor the particular parameter which each switch is connected to control for that particular program.

8 Claims, 5 Drawing Figures

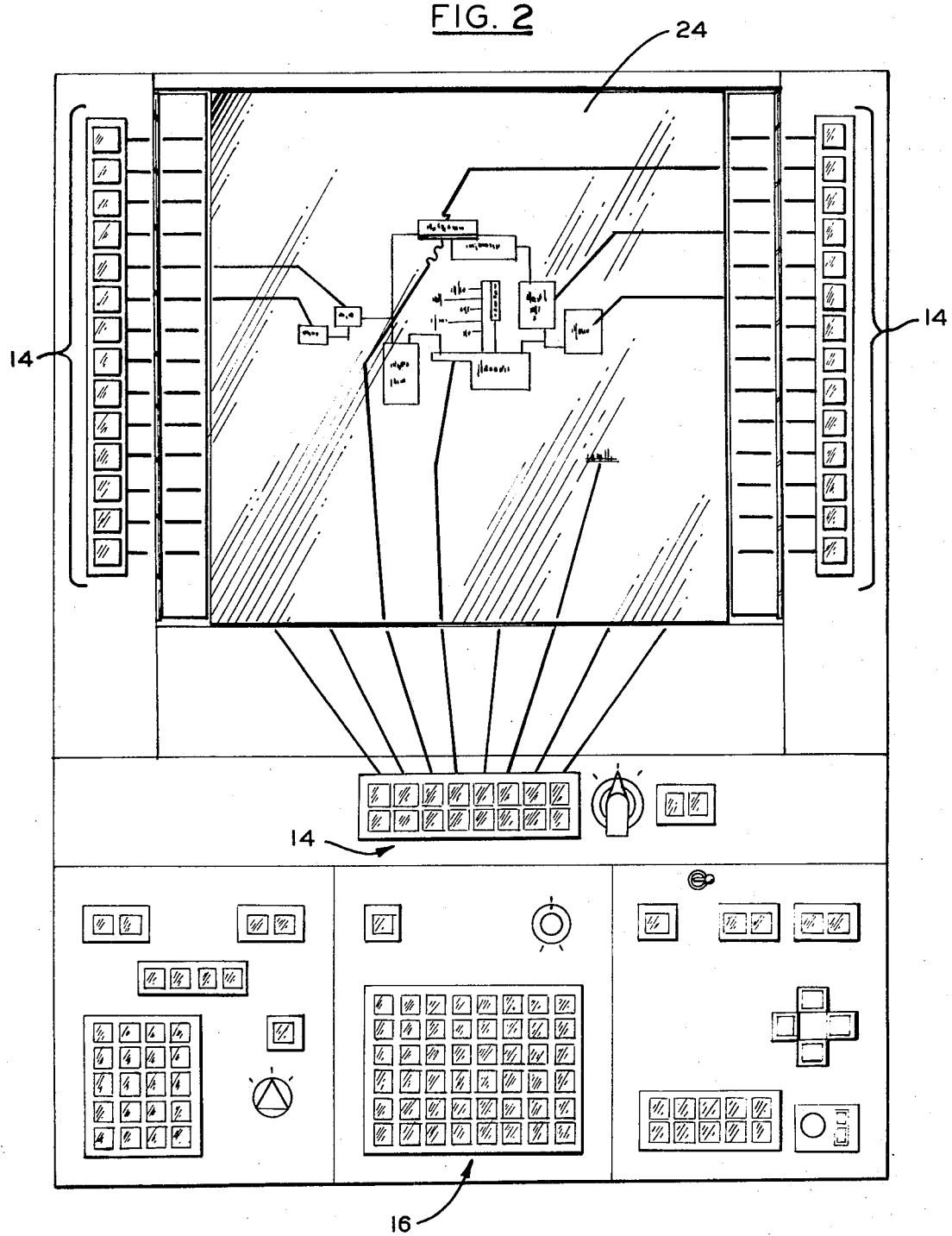

SWITCHING DEVICE AND ASSOCIATED VISUAL DISPLAY FOR TRAINING APPARATUS

The present invention relates to electrical switching systems of the type utilized to control electrical parameters affecting the operation of training apparatus, or the like. More specifically, the invention relates to a novel arrangement of manually actuable switches arranged for operation by an instructor and having an associated visual display which greatly simplifies the task of selecting the desired switch.

In training apparatus such as the highly sophisticated, computer-controlled, aircraft and space vehicle simulating apparatus in current use, means are provided for allowing an instructor to control selectively certain of the electrical parameters affecting operation of the training apparatus. A common means for effecting such control comprises an array of manually operable switches for selective actuation by the instructor to alter in a desired manner the operation of any of literally hundreds of simulated operating parameters of the system. The instructor's station for a modern jet transport simulator, for example, includes switches which may be individually operated to alter the computer outputs controlling operation of many simulator instruments and controls. A number of switches may be provided to allow selective alteration in various parts of the electrical system of the aircraft being simulated, while a number of others may be provided to control parameters associated with the simulated fuel system, still others for the hydraulic system, others for the pneumatic system, and so on.

Obviously, as the number of parameters which are under the selective control of the instructor is increased in order to increase the training value of the simulator, the number of switches becomes very large. This makes it increasingly difficult for the instructor to select and operate a desired switch after deciding to change a particular parameter. It is a principal object of the present invention to provide a switching system for controlling parameters of a training apparatus, such as a flight simulator, wherein a large number of parameters may be controlled with a relatively small number of switches which are arranged in a convenient matrix form for rapid accessability. This is accomplished according to the invention by dividing all of the parameters which are to be controlled into groups or programs corresponding, for example, to the various aircraft systems, a few of which are enumerated above. A first set of switches is provided, at least equal in number to the largest number of parameters to be controlled or altered for any one of the systems or programs. A second group of switches is provided, at least equal in number to the number of systems or programs having parameters which are controlled by the switching system. Switches of the second group are individually operable to connect all or a desired number of the first set of switches with that portion of the computer which establishes or controls parameters of the aircraft system or program with which the actuated switch of the second group is associated. That is, when a first switch of the second group is actuated the necessary number of switches of the first group will be connected to computer terminals affecting, for example, the simulated aircraft hydraulic system, while a second switch of the second group is actuable to connect the necessary number of switches of the first group to computer terminals effecting operation of the simulated aircraft fuel system. Thus, a particular switch in the first group may be operable to produce a simulated drop in pressure at a particular location in the hydraulic system when the aforementioned first switch of the second group is actuated, while the same switch from the first group may produce an indication of a simulated leak at a particular point in the aircraft fuel system when the aforementioned second switch of the second group is actuated.

Although the switching system generally described in the preceding paragraph will provide control over a large number of parameters with relatively few switches, the problem of identifying the particular switch which is actuable to control a given parameter is somewhat more difficult since the same switch from the first group may control any of a number of parameters, depending upon the computer terminal with which it is connected as determined by the particular switch from the second group which has been actuated previously. Another object of the invention is to provide means for conveniently and immediately identifying the parameter which each switch of the first group is actuable to control at any given time. This is accomplished through the use of a unique visual display system which provides a pictorial image to the instructor of the aircraft system simulated by that portion of the computer to which the parameter control switches are connected at any given time. The visual display includes lines extending between pictorial representations of the portions of the system and the particular switches which control such parameters for the system displayed. A given parameter-control switch (i.e., a switch from the first set) may have a line connecting it to a pictorial display of that portion of the simulated aircraft hydraulic system of which it is adapted to control the pressure when a first switch of the second set (i.e., the switch connecting the first set to the simulated hydraulic system computer terminals) and a line connecting the same switch of the first set to the pictorial representation of that point in the fuel system at which actuation of the switch will simulate a fuel leak when a second switch of the second set (i.e., that switch which connects the first set to the computer terminals of the simulated aircraft fuel system) is actuated.

An additional item of equipment commonly provided with aircraft simulators of this type is plotting apparatus for making a visible trace of the simulated path of the aircraft as it is "flown" during an approach or in other controlled maneuvers. It is a further object of the present invention to provide novel and improved means for viewing the trace of a plotting instrument driven by the computer in accordance with the simulated path of the aircraft, such viewing means being incorporated with the aforementioned visual display of the switching system. The plotter is designed to make a visible trace on a transparent or translucent surface which is mounted for movement into and out of superposed relation with the viewing surface of the visual display. Approach charts, maps, or other such pictorial displays may be projected on the viewing surface with the recording surface in superposition therewith to provide a visual indication of the simulated path of the aircraft with respect to the area represented by the map or chart. The pictorial representations of aircraft system, or schematic diagrams thereof, are projected on the same viewing surface when parameter control is exercised by actuation of the aforementioned switches.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 2 is a front elevation of a suggested panel layout of certain elements of the invention;

Figure 1:
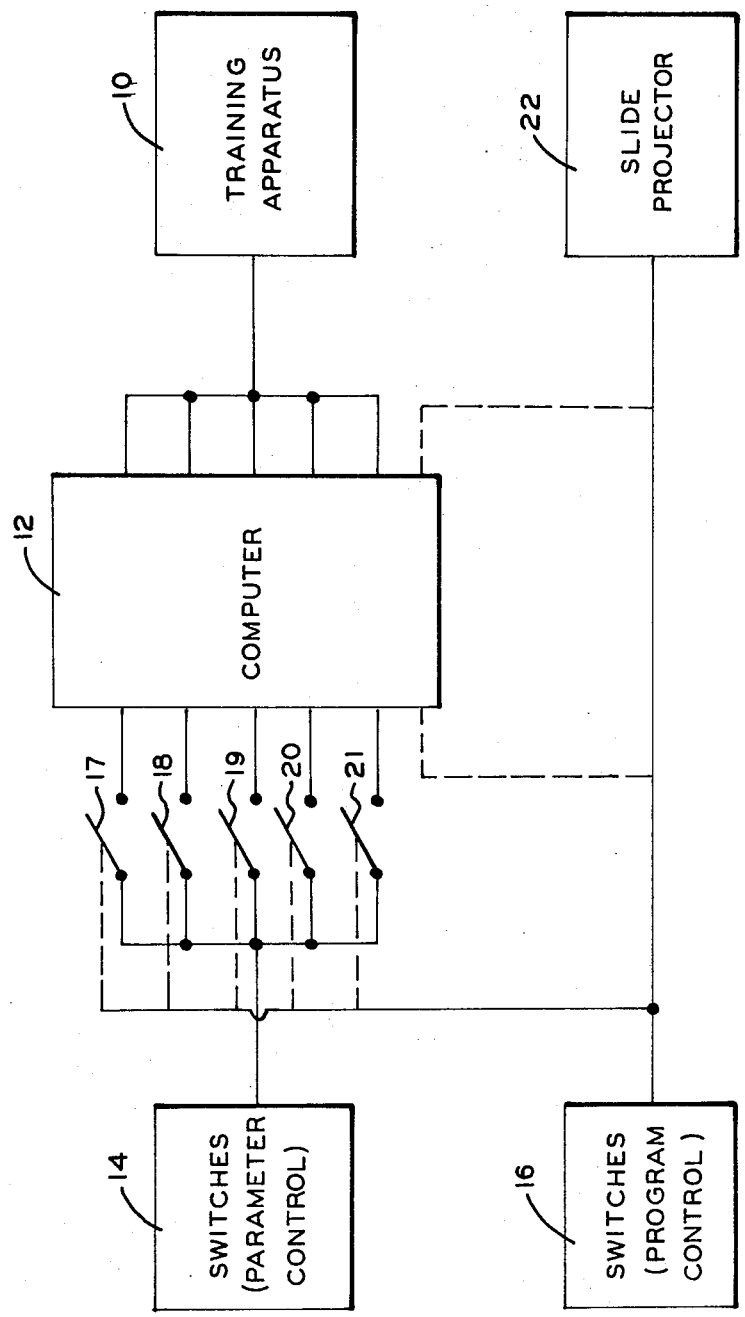
FIG. 1 is a block diagram showing the major components of the invention and schematically indicating their operational relationship with the computer-controlled training apparatus.

The training apparatus indicated by the block numbered 10 in FIG. 1 is intended to encompass devices of an electrical or electronic nature for operation by a student and having a relatively large number of operating parameters controlled directly by inputs from a computer, such as that indicated in the block diagram by reference numeral 12. Typical examples of such training apparatus are the various simulator devices currently in use for training students in the operation and use of actual devices or systems of the type simulated by the training apparatus. For purposes of the present disclosure, training apparatus 10 and the associated elements of the invention, will be assumed to be an aircraft simulator of a relatively large and complex size, such as a modern jet transport simulator. Such simulators, as well as computer hardware and software for controlling operation thereof, are presently in wide commercial and governmental use and details of construction and operation thereof are described in prior patents as well as other publications. Therefore, in the interest of clarity and brevity of disclosure, only those elements unique to the present invention will be described in detail, it being understood that any suitable training apparatus and computer for controlling operation thereof may be constructed according to prior art teachings.

Also shown in FIG. 1 are blocks 14 and 61, each representing a plurality of switch elements arranged for manual actuation by an instructor exercising selective control over certain outputs of computer 12 in order to affect operating parameters of training apparatus 10. The first group or set of switches, indicated by block 14, are termed "parameter control" switches, while the second set or group are termed "program control" switches. Parameter control switches 14 may be connected to any of a number of groups of computer terminals in accordance with actuation of a particular one of program control switches 16. A number of such switches are shown schematically in FIG. 1 and numbered 17, 18, 19, 20 and 21. For example, when switch 17 is closed, parameter control switches 14 may be connected to terminals of computer 12 which affect operation of the simulated aircraft hydraulic system, or instrument indications of operating parameters of the hydraulic system within training apparatus 10. If thirty parameter control switches are provided then up to thirty terminals of computer 12 may receive inputs through selective actuation of the parameter control switches to alter or otherwise control up to thirty parameters of the simulated hydraulic system. In the illustrated embodiment it is intended that only on of program control switches 16 may be closed at any one time so that, if switch 18 is closed switch 17 will open, and parameter control switches 14 will be connected to a different set of computer terminals which may control, for example, up to thirty different parameters of the aircraft fuel system.

Also shown in FIG. 1 is block 22 representing a slide projector, or a number of projectors, having a plurality of slides for display on a viewing surface in a manner described in detail later herein. The particular slide which is selected and displayed is controlled by actuation of program control switches 16, either directly or through computer 12. The slides contain pictorial representations of the various aircraft systems with which each of program control switches are associated. That is, using the previously cited example, when switch 17 is closed, a slide containing an appropriate schematic or diagrammatic showing of the aircraft hydraulic system will be displayed, while closing switch 18 causes projection and display of a slide showing the aircraft fuel system. A selection of slides is also available for projecting images of such things as maps, Jeppeson charts, coordinate systems, and the like, upon which may be superimposed a visible trace representing the path of the simulated aircraft. The combination of the latter means with the visual display and switching system thus far described will be explained later in more detail.

FIG. 2 illustrates a suggested panel layout for that portion of the instructor's station for training apparatus 10 with which the present invention is associated. In this embodiment, parameter control switches 14 are arranged in three groups or rows along the right, left and lower sides of rectangular screen 24. The latter comprises a ground glass or other such conventional display screen for receiving a rear-projected image for viewing by an instructor from the forward side shown in FIG. 2. Program control switches 16 are shown in a rectangular array at the lower center of the control panel. Additional switches and other controls shown on the panel layout may be provided for controlling the simulated aircraft position, slew, weight distribution, panel and projector lamp intensity, and so forth. Also, digital readout devices and other variable indicators for the instructor controls may be provided on the panel.

It will be noted that permanent lines are painted or otherwise provided on the panel face to extend from each of switches 14 to the edge of screen 24. The pictorial display shown on the screen in FIG. 2 represents a projected image of a schematic diagram of one of the aircraft systems mentioned earlier. The pictorial display also includes lines extending from those portions of the schematic diagram representing parameters which may be altered or controlled by switches 14 and joining the line on the panel emanating from the particular switch adapted to control that parameter. In other words, an immediate visual indication is provided of the parameter which may be controlled by each of switches 14 and how that parameter fits into the overall aircraft system. When a different one of switches 16 is actuated, as indicated earlier, a different pictorial display will appear with other lines connecting portions thereof to the lines extending from switches 14.

Figure 4:
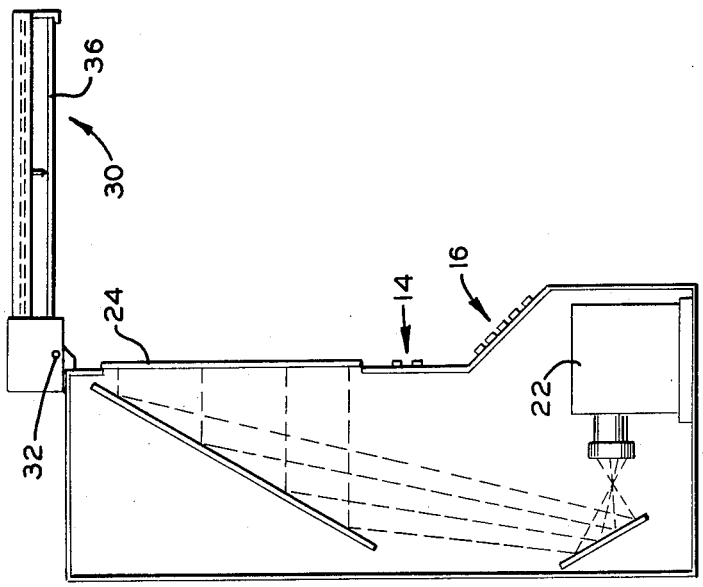
FIGS. 3 and 4 are somewhat diagrammatic side elevational views showing portions of the invention in two positions of their movement.
Figure 3:
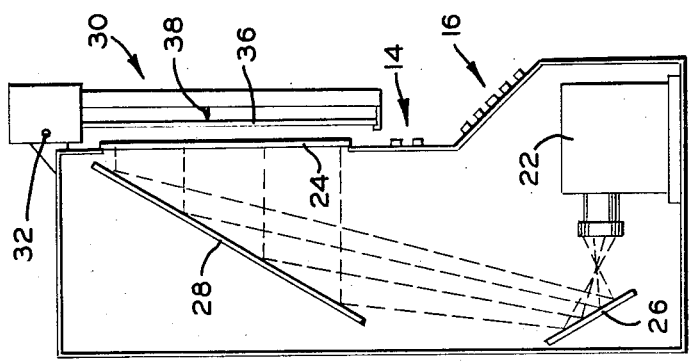
Figure 5:
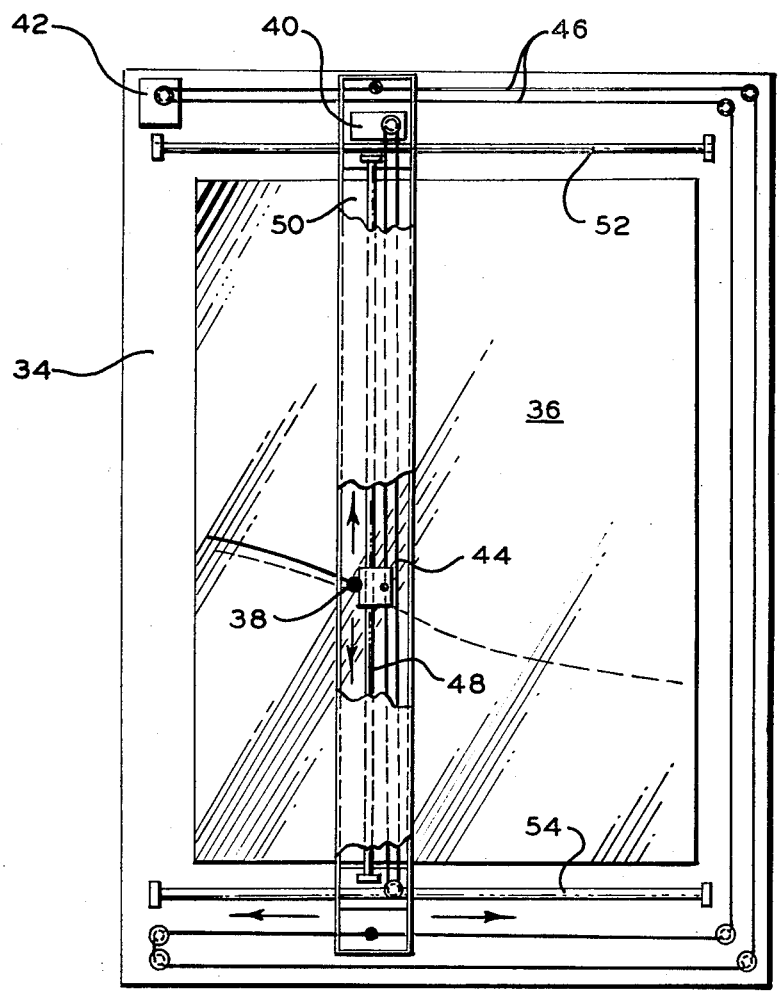
FIG. 5 is a front view, with portions broken away, showing certain elements from FIGS. 3 and 4 in greater detail.

In FIGS. 3 and 4, slide projector 22 is shown projecting an image which is reflected from mirrors 26 and 28 to the rear surface of screen 24 for viewing by an instructor from the opposite side. Also shown in these figures is a plotting instrument, indicated generally by the reference numeral 30. The plotting instrument is shown in more detail in FIG. 5 and is mounted for pivotal movement about point 32 between the positions shown in FIGS. 3 and 4. Plotting instrument 30 comprises a rectangular frame 34 supporting a plotting and viewing surface 36. Pen 38, or other appropriate marking instrument, is mounted for movement across the surface of viewing screen 36, to leave a visible trace of the path of movement of the pen thereon. Drive means 40 and 42 are energized in accordance with signals received from computer 12 to move pen 38 in vertical and horizontal directions, respectively, through cable drives 44 and 46. Movement of cable 44 is transmitted directly to pen 38 which is mounted for reciprocal vertical movement (as seen in FIG. 5) along bar 48. The latter is held by suitable support structure 50 which in turn is mounted for reciprocal horizontal translation along bars 52 and 54. The computer inputs to drive means 40 and 42 are suitably scaled to provide movement to pen 38 which will accurately reflect the simulated path of the aircraft represented by training apparatus 10.

When the instructor wishes to view the trace of the simulated path of the aircraft, he moves plotting instrument 30 to the position shown in FIG. 3 with viewing surface 30 in superposition with screen 24. At this time a selected one of switches 16 may be actuated to cause projector 22 to display a slide of an appropriate coordinate system, map or chart so that the image thereof on screen 24 is superimposed with the trace of pen 38 on surface 36. When the instructor wishes to insert simulated malfunctions or otherwise alter parameters of the simulated aircraft systems, plotting instrument 30 is moved to the position shown in FIG. 4, wherein it is preferably latched or spring biased. Thus, the same projection and display screen is used for viewing both the visual display associated with parameter control of aircraft systems and the superposition of simulated aircraft path with appropriate reference display.

From the foregoing description it is apparent that the present invention provides means for controlling simulated malfunctions and other parameters of computer-controlled training apparatus with great efficiency and ease of operation. The visual display means greatly enhances the instructor's ability to select and actuate the proper switch. It should also be pointed out that the material shown in the visual display, rather than being a schematic diagram of an aircraft system, or the like, may comprise a written instruction or statement of the computer input which may be effected by actuation of the switch to which it is connected (by the aforementioned lines). The precise arrangement of switches and panel layout for the instructor's station are, of course, subject to wide variation as the particular type of training apparatus and other factors dictate.

What is claimed is:

1. A system providing improved control of simulated parameters in training apparatus, said system comprising, in combination:
   a. a vehicle simulator simulating a real-world vehicle having a plurality of discrete operating systems, each with a number of variable parameters represented in said simulator by electrical signals;
   b. a plurality of manually operable first switches for selecting one of said systems for selective control of the electrical signals representing the parameters thereof;
   c. a plurality of manually operable second switches connected to control respective electrical signals representing said parameters;
   d. a viewing surface arranged for viewing by an instructor positioned to operate said first and second switches;
   e. means for displaying on said viewing surface a pictorial illustration of a schematic diagrams of the particular system selected, said illustration including the individual, variable parameters represented by the electrical signals to be controlled at any given time, and
   f. a plurality of lines on each of said schematic diagrams extending from the schematic representation thereon of one of said parameters to a point at the edge of said second switches which controls the parameter from which the line extends.

2. The invention according to claim 1 wherein said pictorial display is projected on said viewing surface from a remote location.

3. The invention according to claim 2 and further including a slide projector with a supply of individual slides each bearing a pictorial illustration of said operating systems for selective display on said viewing surface in accordance with operation of said first switches.

4. A visual display system for use in conjunction with an aircraft simulator having instruments and controls said display system comprising, in combination:
   a. an electronic computer adapted to provide electrical signals commensurate with simulated operating parameters of the aircraft including simulated flight path thereof;
   b. a viewing surface upon which said slides may be projected;
   c. plotting means operable to plot a visible trace of the simulated flight path in accordance with signals from the computer commensurate therewith;
   d. first switch means selectively operable to cause a selected one of said slides to be projected on said viewing surface; and
   e. means for superimposing said visible trace on said viewing surface, whereby a visible indication of the simulated flight path may be related to said flight charts and patterns whenever a slide from said first group is projected.

5. The invention according to claim 4 wherein said plotting means comprises an X-Y plotter mounted for movement between a first position, wherein the trace provided thereby is superimposed with said viewing surface, and a second position, remote from said viewing surface.

6. The invention according to claim 5 wherein said plotter is mounted for pivotal movement between said first and second positions.

7. The invention according to claim 4 and further including a plurality of individual second switch means operable to affect respective electrical signals representative of various groups of the simulated aircraft operating parameters, certain of said first switch means being operable to change the group of parameters which said second switch means affect and likewise to cause to be projected a slide from said second group depicting physical portions of the aircraft simulated which are associated with the parameters of the group which said second switches are operable to affect.

8. The invention according to claim 7 and further including indicia arranged to indicate the connections between the parameters shown on the slide projected and the ones of said second switches operable to affect the electrical signals commensurate therewith.

* * * * *